May 1, 1956 V. V. VEENSCHOTEN 2,743,706
AUTOMATIC LOCKING MEANS FOR FLUID PRESSURE OPERATED DEVICES
Filed Aug. 16, 1954 3 Sheets-Sheet 3

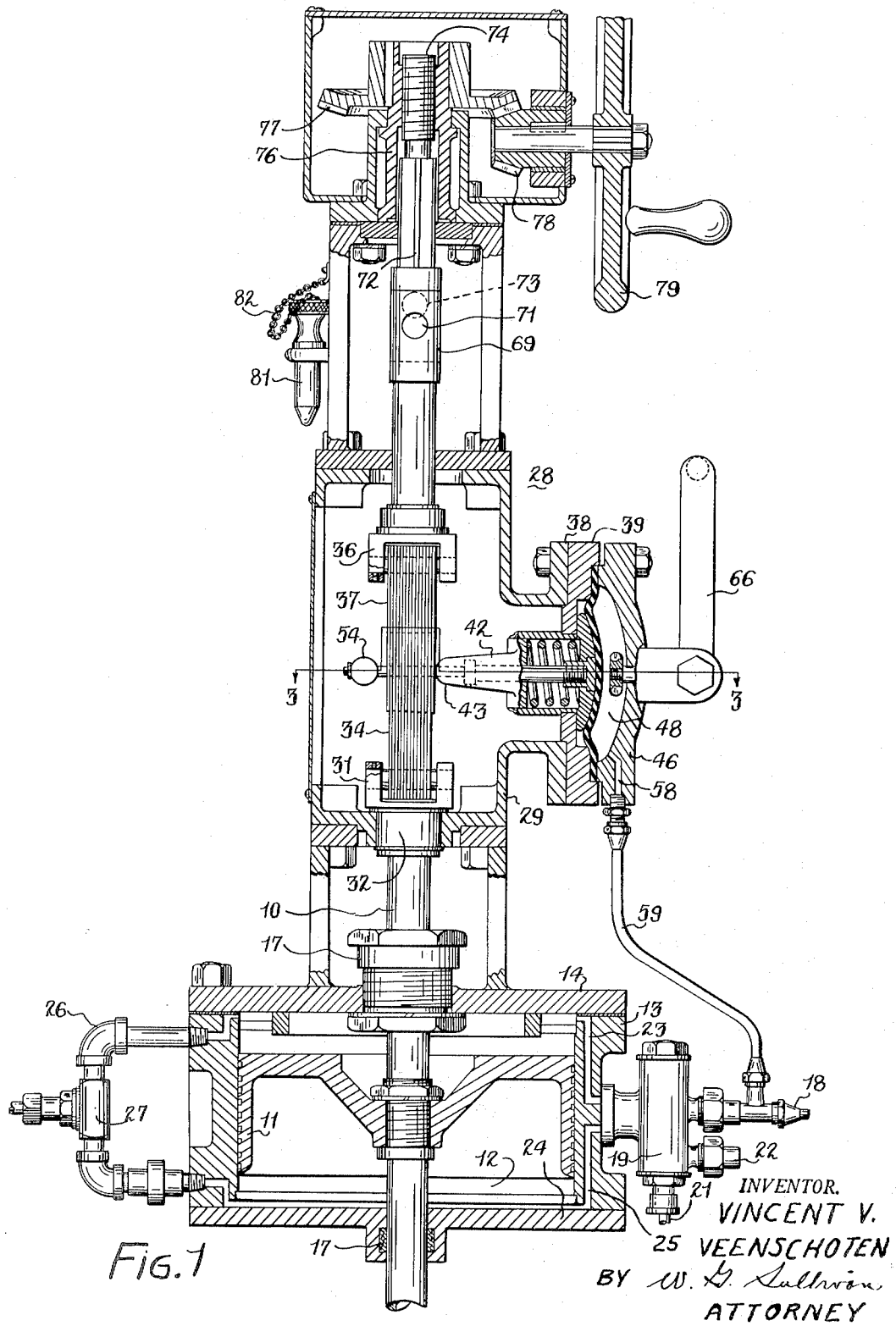

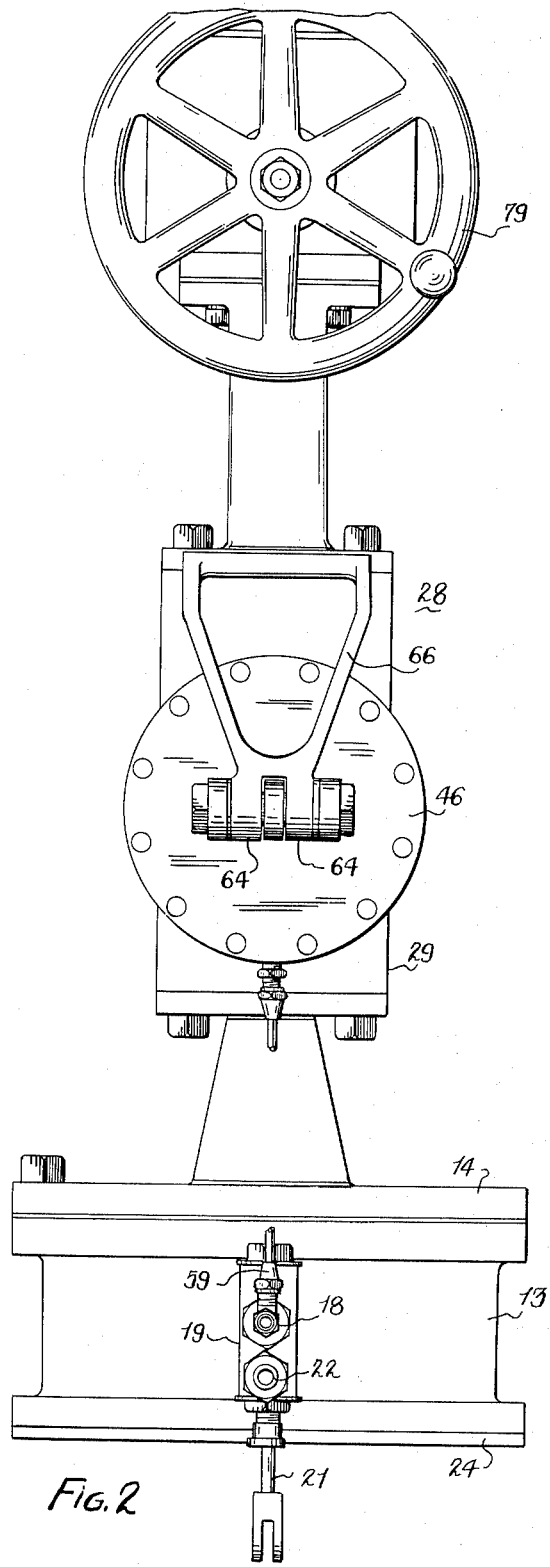

INVENTOR.
VINCENT V. VEENSCHOTEN
BY
W. G. Sullivan
ATTORNEY

United States Patent Office 2,743,706
Patented May 1, 1956

2,743,706

AUTOMATIC LOCKING MEANS FOR FLUID PRESSURE OPERATED DEVICES

Vincent V. Veenschoten, Erie, Pa., assignor, by mesne assignments, to Blaw-Knox Company, Pittsburgh, Pa., a corporation of Delaware Application August 16, 1954, Serial No. 450,194

2 Claims. (Cl. 121—40)

This invention relates to automatic locking means for fluid pressure operated valves and the like, and more particularly to automatically operable means for holding a valve or the like in the position it occupies in the event the fluid pressure fails for any reason.

Although the invention will be illustrated and described in connection with a feed water control valve for boilers wherein the control valve is operated by fluid pressure, it will be understood that it is equally adaptable to various other control devices operable by fluid pressure wherein it is important that the device, be immediately held in its position in the event of failure of the fluid operating the device. For example, it is common practice to employ air pressure for operating the feed water control valves for boilers and if the air pressure should fail the least harm would be done if the valve is held at its position at the time failure occurs. This will be apparent when it is considered that if the feed water valve is partially opened in response to boiler feed water demand when failure of fluid pressure occurs it is a measure of the steam demand of the system at such time and it is obvious that holding the valve in accordance with system demand is highly desirable relative to permitting the valve to drift towards either fully open or fully closed position.

I am aware that it has previously been proposed to hold a control valve operable by fluid pressure against movement in the event of fluid pressure failure. Prior arrangements with which I am familiar comprise a rack or serrated bar operably connected to the stem of the control valve and upon fluid pressure failure a pointed plunger or balls are adapted to engage the rack tooth spaces or bar serrations for locking action. Since the locking or holding force on a feed water valve must be substantial, the tooth spaces or serrations must be relatively wide and appreciable drift of the valve may occur before the plunger seats or the balls wedge and due to the small travel of the valve from fully open to closed position this drift may cause a highly undesirable change in the controlling effect of the valve. I have devised a locking means wherein the valve will be immediately locked in its last position before fluid pressure failure and without drift.

According to the invention, a stem connected to a control valve or the like is movable axially in reverse directions in response to varying differential fluid pressure on a fluid pressure motor such as a piston or diaphragm operably connected to the stem. Spaced fixed plates have plates movably associated with the stem telescoped therebetween. The fixed and movable plates are normally held in loosely sliding relation by the fluid pressure operating the motor but in the event of fluid pressure failure the movable plates are immediately brought into tight frictional engagement with the fixed plates by spring means thereby locking the stem and its associated control valve or the like against movement.

It is a primary object of the invention to provide means for automatically locking a fluid pressure actuated device in the position it occupies at the time of failure of fluid pressure.

Another object of the invention is to provide automatic locking means of the above type together with manual means for overcoming the locking means and moving the device.

Another object of the invention is to provide means for automatically locking a fluid pressure operated boiler feed water valve in the position it occupies at time of pressure failure whereby feed water will continue to be supplied in accordance with demand at the time failure occurs.

Other objects of the invention and the invention itself will become increasingly apparent from a consideration of the following description and drawings wherein:

Figure 1 is a vertical sectional view of a fluid pressure operated device embodying the invention.

Figure 2 is a right hand side elevational view of the device shown in Figure 1.

Figure 4:
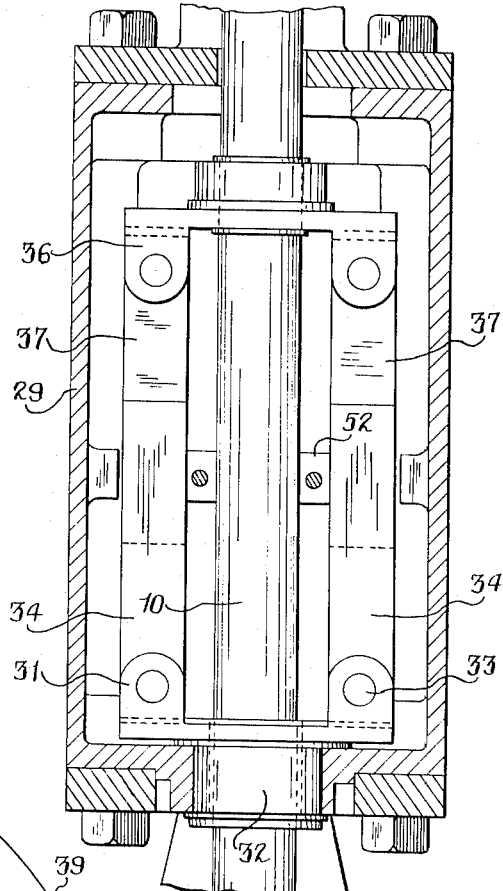

Referring now to the drawings, and particularly Figure 1, I have indicated at 10 an axially movable stem which at its lower end may be connected to a feed water control valve or the like (not shown). The stem is connected to and movable by a piston 11 disposed in a cylinder generally indicated at 12. The cylinder comprises a cylindrical side wall 13, a top plate 14, and a bottom plate 24. Stem 10 projects through stuffing boxes or seals 17 mounted in the top and bottom plates of cylinder 12.

An air entry line 18 leads to a pilot valve 19 which is operable by an axially movable stem 21 responsive to the feed water demands of the system, an air exhaust line from the pilot valve being indicated at 22. Upon increased demand for feed water the pilot valve admits air under pressure through a port 23 to the cylinder space above piston 11 and concurrently through a port 25 connects the cylinder space beneath piston 11 with exhaust line 22. Upon decreased demand for feed water the reverse action occurs. The upper and lower zones of the cylinder 12 are connected by a bypass 26 having communication therethrough normally closed by a manually operable valve indicated at 27.

A superstructure, generally indicated at 28, is mounted on top plate 14 and includes a generally box shaped housing 29 having a lower yoke member 31 fixed to the base thereof. The yoke member 31 has a tubular portion 32 forming a guide bearing for stem 10. Secured to member 31 by pins 33 are a plurality of spaced rectangular metal plates as indicated at 34. Fixed to and movable with stem 10 is an upper yoke member 36 having a plurality of spaced rectangular metal plates 37 pinned thereto, plates 37 substantially axially overlapping and loosely fitting between adjacent plates 34. Housing 29 has a lateral opening terminating in a flange 38 to which is secured a plate 39 in which is mounted a tube 41. Tube 41 rigidly supports a forked member 42, having rounded ends as indicated at 43, adapted to abut the right hand end plate 37 (Fig. 1). The plates 34 and 37 are slidable along their associated mounting pins such as 33.

A rubber or the like diaphragm 44 is clamped between plate 39 and a second plate element 46 having a pair of outwardly extending spaced arms 47. A fluid chamber 48 is thus formed between one side of the diaphragm and element 46. A disc 49 is secured to the opposite side of diaphragm 44 to which is secured a rod 51 which is slidably projected through forked member 42 and threadedly engages a bar 52. Bar 52 has two rods 53 extending therefrom and between the inner edges of plates 34 and 37 and stem 10 to support a circular rod or abutment 54, the rods projecting through the abutment and being secured in any suitable manner as by snap rings 56. A compression spring 57 encircles rod 51 with one end abutting the fixed forked member 42 and its opposite end engaging disc 49 to continuously urge abutment 54 towards plates 34 and 37 against the fluid pressure in chamber 48 exerted on diaphragm 44.

Figure 3:
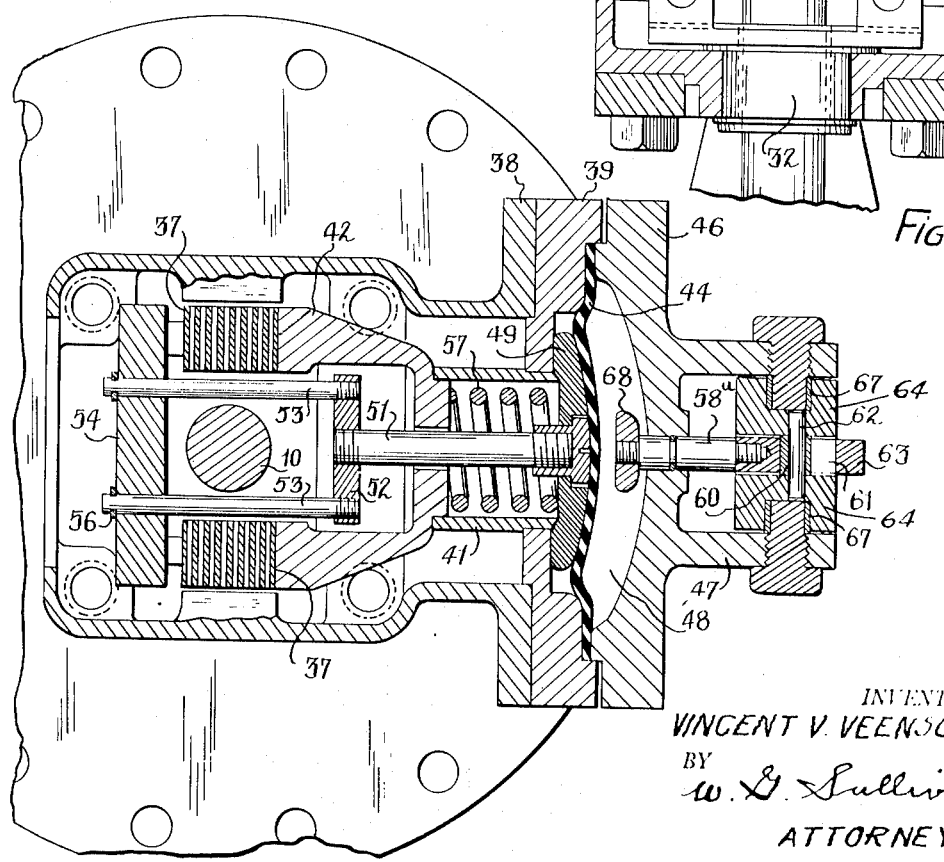
Figure 3 is a transverse sectional view taken along the line 3—3 of Figure 1 and, Figure 4 is an enlarged fragmentary vertical sectional view showing the locking means.

Plate element 46 has a port 58 therein which through a line 59 communicates with the air pressure supply line 18 whereby chamber 48 is continuously subjected to the pressure in line 18. Figure 3 shows the parts in normal operating position wherein the fluid pressure in chamber 48 acting against the force of spring 57 holds abutment 54 out of contact with the locking plates. In the event of fluid pressure failure the drop in pressure in chamber 48 will permit spring 57 to move abutment 54 to the right to contact the locking plates and clamp the plates 34 and 37 into locking engagement between forked member 42 and the abutment.

A manual means of overcoming the force of spring 57 to move abutment 54 to the position illustrated in Figure 3 is provided. This means comprises a rod 58a fixed to a disc 63 having an eccentric bore 61 through which is projected a pin 62 having a roller 60 thereon. The pin 62 is mounted in the forks 64 of a hand lever 66, the forks being pivoted on bearings 67 having an axis spaced from that of pin 62 whereby as the lever 66 is rocked in a clockwise direction (Figure 1) a button 68 on the end of rod 58a will engage diaphragm 44 and force abutment 54 to the left or away from plates 34 and 37.

The upper end of stem 10 has a sleeve 69 secured thereto which has aligned transverse holes 71 therein. The sleeve receives the lower end of a short shaft 72, preferably formed with guide fins, and provided with a transverse hole 73. The upper end of shaft 72 abuts a pin 74 threaded in an axially fixed but rotatable sleeve 76 keyed to a bevel gear 77. Gear 77 engages a bevel pinion 78 rotatable by a hand wheel 79. A pin 81, preferably secured to superstructure 28 by a chain 82, is adapted to be projected through holes 71 and 73 to inter-lock stem 10 and shaft 72.

The operation of the device will now be described in connection with a valve controlling flow of feed water to a boiler. In a well known manner stem 21 will be moved in response to variation in demand for boiler feed water. Upon increased demand for feed water the stem 21 will be moved in a direction causing the feed water valve to open to a greater degree and upon decreased demand the stem 21 will move in a direction causing the feed water valve to move in a closing direction. The feed water valve (not shown) is secured to the lower end of stem 10 and since stem 10 is secured to piston 11 the flow of feed water will be determined by piston movement or position. As previously explained, a fluid such as air is supplied under substantially constant pressure to pilot valve 19 by conduit 18. In the event the fluid pressure in conduit 18 fails or drops substantially the decreased pressure will be immediately communicated to chamber 48 permitting spring 57 to force diaphragm 44, rod 51, rods 53 and abutment 54 to the right (Figure 3). Since forked member 42 is fixed, the fixed plates 34 and movable plates 37 are immediately forced into tight frictional contact preventing movement of stem 10 and resultantly the feed water valve. It will be apparent that the above described action occurs immediately upon fluid pressure failure since the frictional contact area between plates 34 and 37 is relatively large, the spring 57 has considerable thrust since the relatively large area of diaphragm 44 can overcome a powerful spring at the fluid pressures normally used, and upon fluid pressure failure the feed water valve is not permitted to drift from its position at the time failure or substantial drop in fluid pressure in supply line 18 occurs.

It is well known that a boiler feed water valve has relatively little travel from fully closed to fully open position and this will be apparent from a consideration of Figure 1 wherein piston 11 which moves in correspondence with the feed water valve is permitted relatively little axial movement. It will be apparent that the least harm would occur in a system if a feed water valve, in the event of failure of the means operating the valve, was locked in a position delivering feed water at the rate demanded at the time of failure. Due to the small travel of the feed water valve any appreciable drift before locking of the valve results in considerable variation in the rate at which feed water is supplied to the boiler. When it is considered that modern high pressure boilers can evaporate considerable quantity of water in a short period of substantial reduction in the rate at which feed water is being supplied relative to the demands of the system could have serious consequences, and this can only be avoided by preventing any drift upon failure of the fluid pressure means operating the feed water valve.

In the event of fluid pressure failure the stem 10 and the feed water valve would be immediately locked against axial movement as previously explained. However, since the demand for feed water will vary I have provided emergency manual means for operating the feed water valve. In the event stem 10 is locked against axial movement due to frictional contact of plates 34 and 37, hand lever 66 can be rocked in a clockwise direction (Figure 1) forcing abutment 54 to the left or to the position of Figure 3 and permitting stem 10 to move axially. Rotation of hand wheel 79 will bring holes 71 and 73 into transverse alignment whereupon pin 81 can be projected through said holes to interlock stem 10 and short shaft 72. Thereafter rotation of hand wheel 79 will move stem 10 and the feed water valve axially upwardly or downwardly.

It will be understood that the fluid pressure acting on diaphragm 44 is normally substantially constant and effective to overcome the force of spring 57. However, when a fluid pressure failure occurs, as would be evidenced by a substantial drop in pressure in line 59 and resultantly chamber 48, spring 57 is sufficiently strong to bring plates 34 and 37 into tight frictional engagement. Plates 34 and 37 have sufficient frictional contact area that under these conditions stem 10 is immediately locked in the position it occupies at the time of fluid pressure failure. I have found that under these conditions an immediate locking action occurs without any drift if spring 57 has sufficient force and the plates 34 and 37 have sufficient contact area. In other words, I have found that by properly designing spring 57 relative to the force normally exerted by diaphragm 44 and relating the contact area of plates 34 and 37 to the effective spring force (consistent with the coefficient of friction of the material used for plates 34 and 37) that no drift of the feed water valve occurs upon fluid pressure failure. It will be apparent that if any drift of the feed water valve occurs under these conditions that the valve will continue to drift but I have found that the locking means disclosed prevents any drift of a feed water valve controlling the flow of water into modern high pressure boilers.

I have described the invention primarily in connection with a boiler feed water control valve but it is understood that the invention is equally adaptable to any control element movable by fluid pressure and wherein it is highly desirable that the control element be immediately locked in position upon failure of fluid pressure.

I wish it to be understood that I do not desire to be limited to the exact details of construction shown and described, for obvious modification will occur to persons skilled in the art.

What I claim is as follows:

1. The combination with a control device having an axially movable stem secured thereto, a fluid pressure motor operably connected to the stem, a source of fluid pressure for the motor, a pilot valve for controlling the flow of fluid under pressure to the motor, and means for operating the pilot valve in response to varying demands of a condition controlled by the control device, of means for locking the control device in the position occupied at the time fluid pressure failure occurs, said means comprising a plurality of axially extending fixed plates, a plurality of axially extending plates secured to and movable with said stem, normally the fixed and movable plates being in slightly spaced apart relation, movable abutment means adapted to bring the fixed and movable plates into locking frictional contact, spring means constantly urging the abutment means towards locking position, fluid pressure responsive means opposing said spring means and operative to hold the abutment means against movement at normal fluid pressure for operating the motor, and means connecting the fluid pressure responsive means with the fluid pressure source whereby upon fluid pressure failure the abutment means will be immediately moved to locking position to hold the control device in the position it occupied at the time of fluid pressure failure.

2. The combination with a control device, a fluid pressure motor operably connected to the device, a source of fluid pressure, and means for subjecting the fluid pressure motor to varying fluid pressure to move the control device in accordance with varying demands of a condition controlled by the control device, of automatic means for locking the control device in the position it occupies at the time and in the event of fluid pressure failure, said automatic means comprising a plurality of spaced generally rectangular plates projecting axially of the control device and having axially fixed frictional surfaces, a plurality of spaced generally rectangular plates projecting axially of the control device and movable therewith, said movable plates having frictional surfaces adapted to engage the fixed frictional surfaces, the fixed plates being loosely telescoped between adjacent movable plates to provide substantial contact area therebetween, locking means adapted to slide the fixed and movable plates a slight distance laterally to bring the frictional surfaces thereof into tight engagement, fluid pressure responsive means normally holding the locking means in inoperative position, and means effecting communication between the source of fluid pressure and the pressure responsive means whereby upon failure of fluid pressure the locking means will be immediately operated to bring the fixed and movable surfaces into engagement to hold the control device in the position it occupied at the time of fluid pressure failure.

References Cited in the file of this patent

UNITED STATES PATENTS

| Number | Name | Date |
|---|---|---|
| 986,392 | John | Mar. 7, 1911 |
| 1,140,481 | Rank | May 25, 1915 |
| 1,962,677 | Dickey | June 12, 1934 |